No. 895,748. PATENTED AUG. 11, 1908.
O. GUNDERSON.
FLUID WEIGHING MACHINE.
APPLICATION FILED MAY 9, 1907.

2 SHEETS—SHEET 1.

Witnesses
Inventor
By Ole Gunderson
Attorney

No. 895,748. PATENTED AUG. 11, 1908.
O. GUNDERSON.
FLUID WEIGHING MACHINE.
APPLICATION FILED MAY 9, 1907.

2 SHEETS—SHEET 2.

Witnesses
Inventor
Ole Gunderson
By D. A. Gourick
Attorney

UNITED STATES PATENT OFFICE.

OLE GUNDERSON, OF BRISTOL TOWNSHIP, WORTH COUNTY, IOWA.

FLUID-WEIGHING MACHINE.

No. 895,748.      Specification of Letters Patent.      Patented Aug. 11, 1908.

Original application filed March 19, 1906, Serial No. 306,931. Divided and this application filed May 9, 1907.
Serial No. 372,706.

*To all whom it may concern:*

Be it known that I, OLE GUNDERSON, a citizen of the United States, residing in Bristol township, in the county of Worth and State of Iowa, have invented certain new and useful Improvements in Fluid-Weighing Machines, of which the following is a specification.

The invention hereinafter described is a division of a certain application for patent filed by me on March 19, 1906, and given Serial No. 306,931, and relates to machines for weighing fluids.

The object of my invention is to provide an improved machine for weighing fluids and is especially adapted to use in weighing milk in creameries as will be more fully described hereinafter and illustrated in the accompanying drawings in which—

Figure 1:
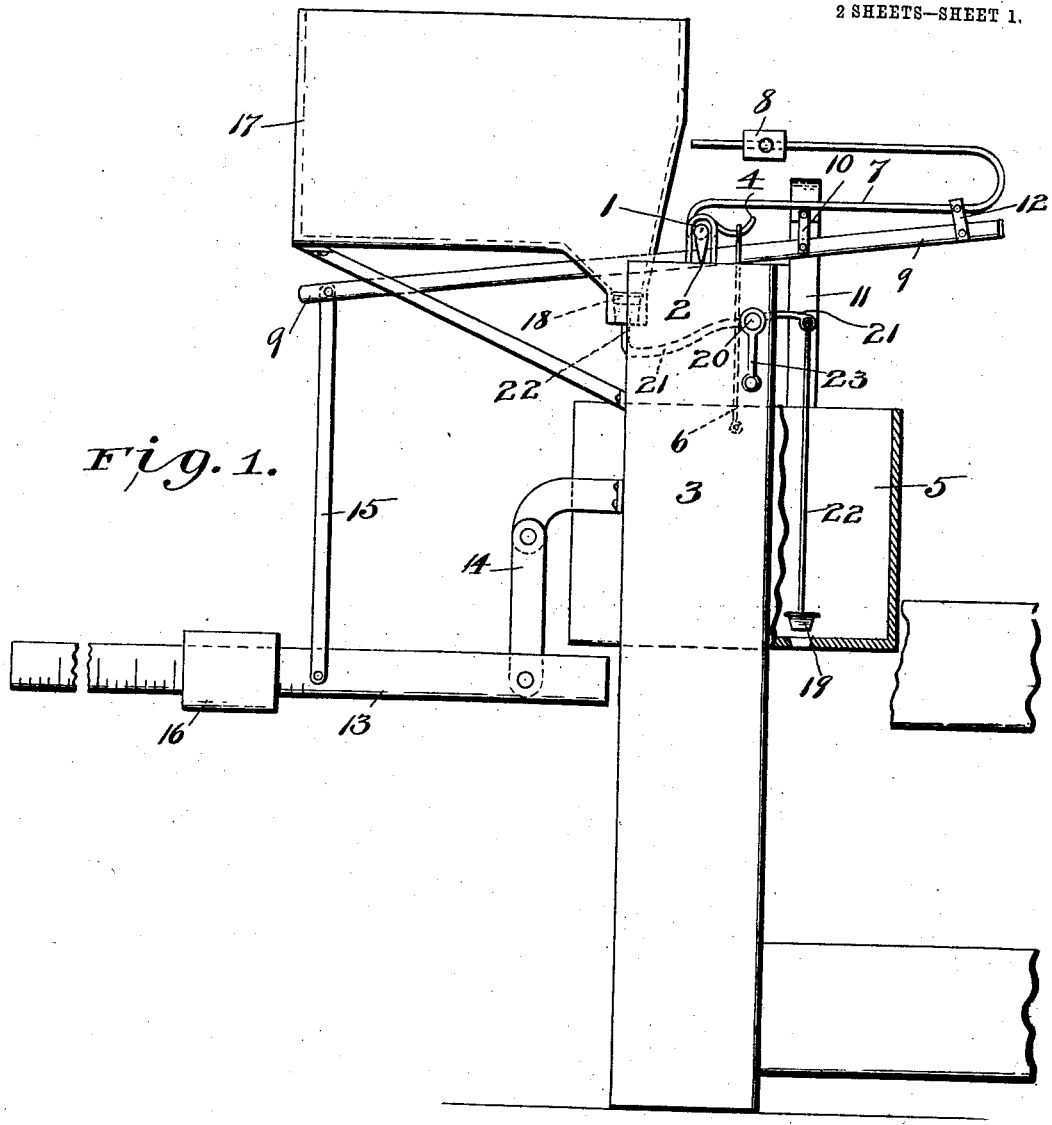
Figure 3:
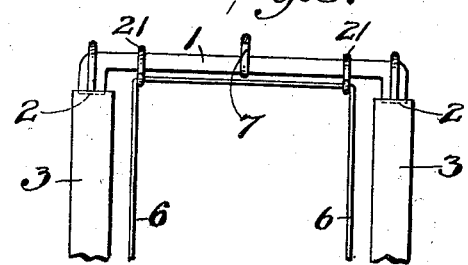
Figure 2:
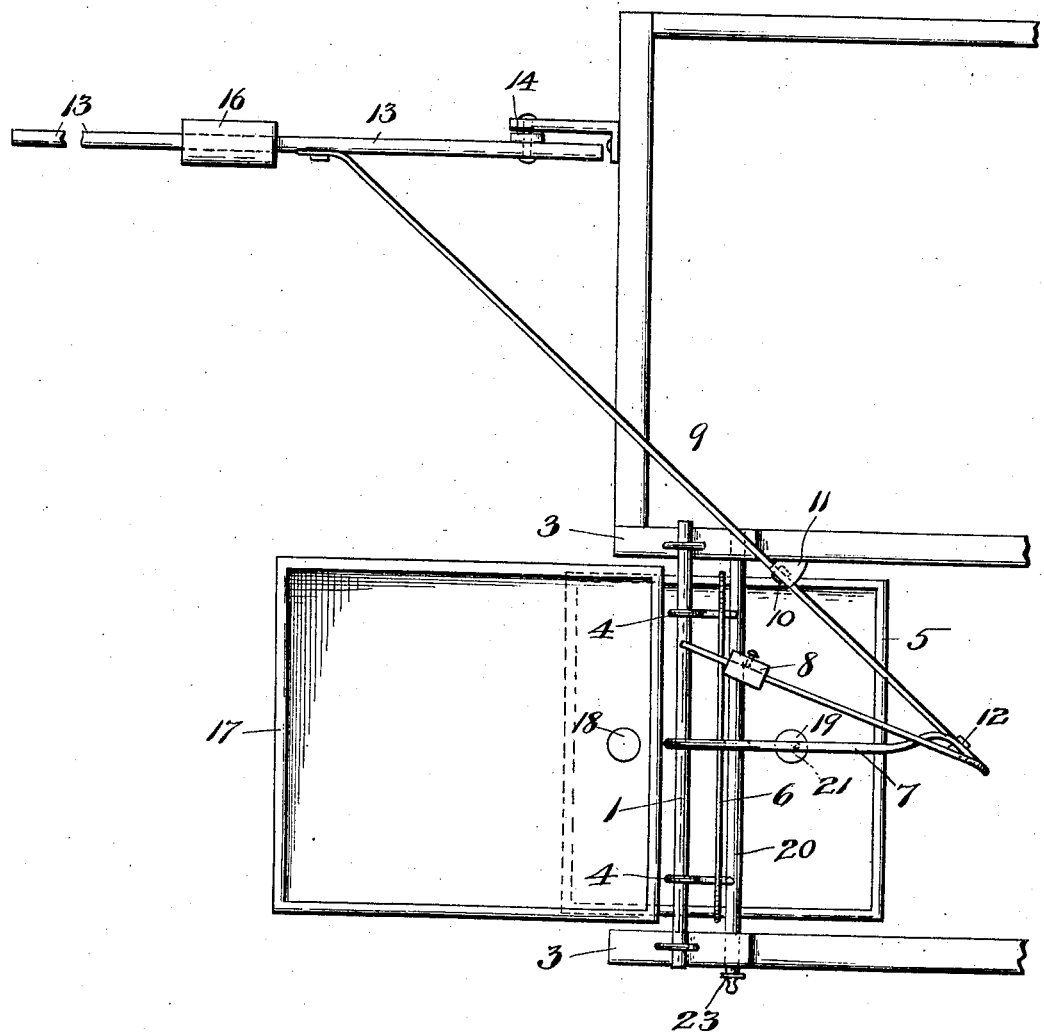

Figure 1 is a side view of my improved weighing machine, Fig. 2, a top plan view, and Fig. 3, an end view.

In the drawings similar reference characters indicate corresponding parts throughout the several views.

My invention consists of a balance beam 1 having knife blade edges 2 on its ends resting on uprights 3.

4 indicates hooks secured to the beam 1 from which is suspended a receptacle 5 by means of a chain 6 or other flexible element. An arm 7 is secured to beam 1 having its free end bent back on itself and provided with an adjustable balance-weight 8 to balance the scale beam, hereinafter described, and the receptacle 5.

9 indicates a lever fulcrumed on links 10 pivotally secured to an upright 11. One end of lever 9 is connected with arm 7 by means of links 12 so that when the receptacle 5 is depressed the arm 7 depresses the end of the lever 9 to which it is secured.

13 indicates a scale beam fulcrumed on support 14 and connected with the free end of lever 9 by means of rod 15. 16 indicates the balance weight slidably mounted on scale beam 13.

17 indicates a storage tank to hold the fluid to be weighed which may be permanently secured above the receptacle 5 and provided with a valve 18 to control the flow of liquid therefrom, while 19 indicates a valve in the bottom of receptacle 5 to control the flow of the liquid from the machine. Valves 18 and 19 are operated by rock shaft 20 having arms 21 extending therefrom and connected to said valves by means of rods 22. 23 indicates a crank on the end of rock shaft 20 that may be actuated manually to open and close valves 18 and 19.

When my machine is in operation as long as the valve 18 is open and valve 19 closed the fluid will pour from tank 17 into receptacle 5 but as soon as the amount of the fluid in receptacle 5 is sufficient to overbalance the scale beam 13, showing that the proper amount of the fluid had been measured, the shaft 20 is turned by means of crank 23 so that valve 18 is closed to prevent more fluid pouring from the tank 17 and valve 19 opened to permit egress of the fluid from the receptacle 5. As soon as the receptacle is empty the weighing operation may be repeated by properly manipulating the valves 18 and 19.

Having thus described my invention what I claim is—

A weighing machine comprising uprights, a balance beam having knife edges supported by said uprights, hooks secured to said balance beam, a receptacle, a flexible member secured to said receptacle and engaging said hooks, an arm secured to said balance beam having a balance weight thereon, a scale beam, a lever suitably fulcrumed, links connecting one end of the lever with the arm aforesaid, other links connecting the other end of the lever with the scale beam, a storage tank positioned to deliver into the receptacle aforesaid, a valve in the tank, a valve in the receptacle, a rock shaft, rods connecting said rock shaft and valves, and means to operate the shaft, substantially as shown and described.

In testimony whereof I hereto affix my signature in the presence of two witnesses.

OLE GUNDERSON.

Witnesses:
    W. A. WESTFALL,
    M. H. KEPLER.